Figure 4:
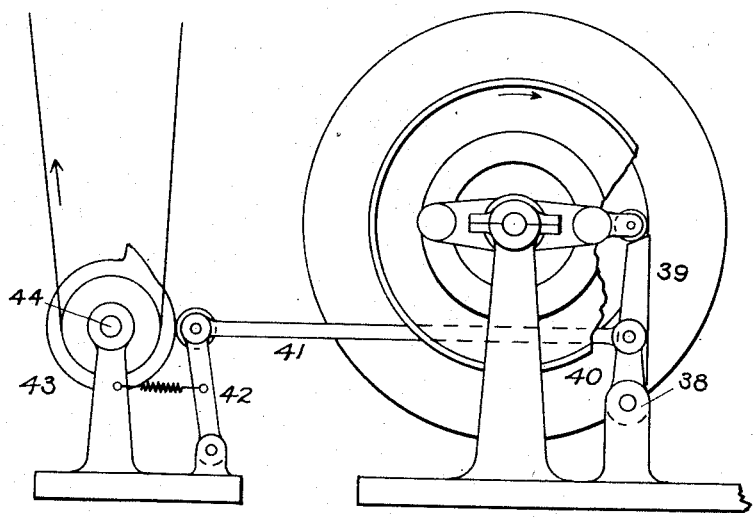

E. G. THOMAS.
SYNCHROROTOR.
APPLICATION FILED OCT. 23, 1909.
1,045,909.
Patented Dec. 3, 1912.
2 SHEETS—SHEET 1.
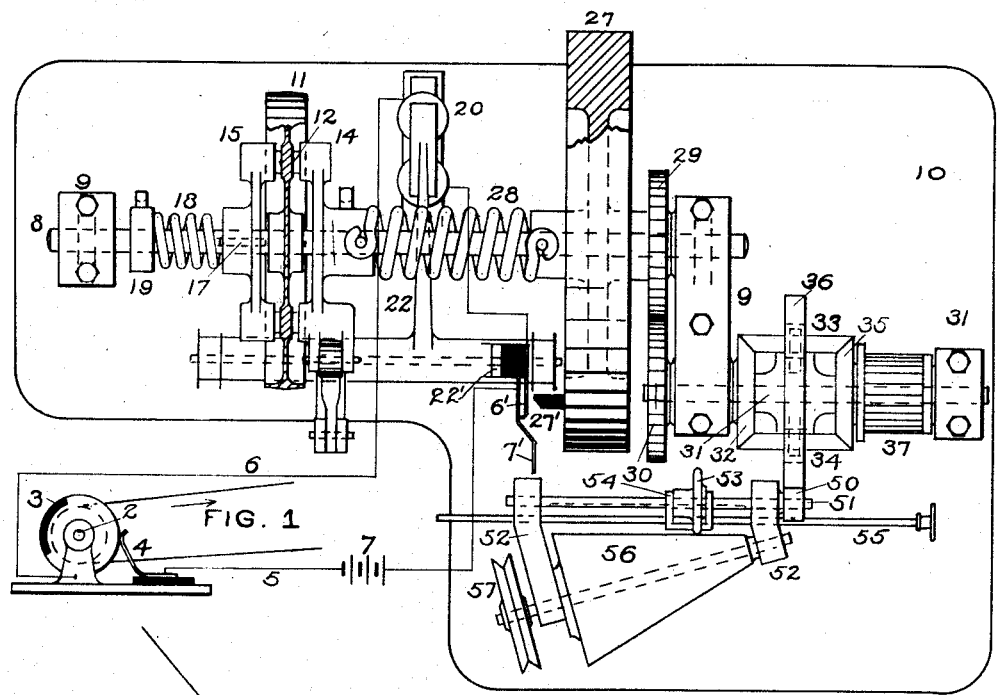
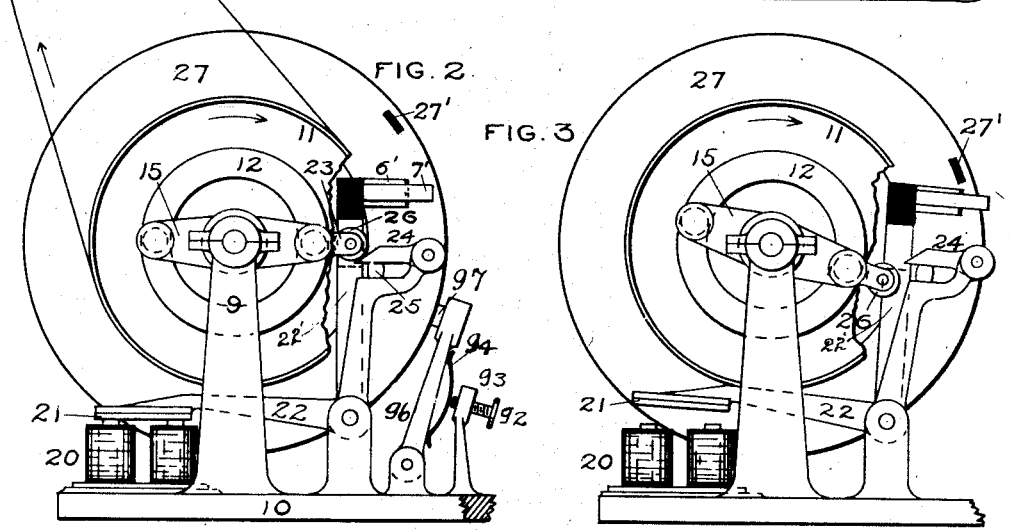
WITNESSES
Geo. R. Beal
Chas. Fogg
INVENTOR
Edward G. Thomas

E. G. THOMAS.
SYNCHROROTOR.
APPLICATION FILED OCT. 23, 1909.

1,045,909.

Patented Dec. 3, 1912.
2 SHEETS—SHEET 2.

WITNESSES
Geo. R. Beal
Chas. Fogg

INVENTOR
Edward G. Thomas

UNITED STATES PATENT OFFICE.

EDWARD G. THOMAS, OF BROOKLYN, NEW YORK.

SYNCHROROTOR.

1,045,909.   Specification of Letters Patent.   Patented Dec. 3, 1912.

Application filed October 23, 1909. Serial No. 524,284.

*To all whom it may concern:*

Be it known that I, EDWARD G. THOMAS, of Brooklyn, county of Kings, State of New York, have invented and produced certain new and useful Improvements in Synchrorotors, of which the following is a specification, reference being had to the accompanying drawings, which form a part thereof.

My invention is intended to provide an improved apparatus by which the movements of a mechanical device, such as a rotating shaft, may be controlled by and made synchronous with the periodic movements of another device,—for example, a pendulum or another rotating shaft,—apparatus of this character being useful in many ways, such as in connection with synchronous telegraphy, clocks, astronomical instruments, steam engine governors, and the like. For convenience the former device and its operating mechanism may be termed the "governed device", and the latter the "controlling device."

The controlling device may consist of any assemblage of parts having a periodic rotary or reciprocating motion, such as a clock pendulum, while the governed device may be described in a general way as comprising:— a rotating member which is driven by power from an outside source at a speed of rotation greater than the speed which the system is designed to impart to the above apparatus; a yielding driving connection between the above apparatus and the rotating member; and means for controlling the number of revolutions of the rotating member by a mechanical or electrical connection between the controlling device and the governed device so that the number of revolutions of the rotating member in a given time will be equal to or a multiple or integral part of the total number of revolutions or movements of the controlling device in the same time.

The specific form to which the greater part of the following description applies is that in which the controlling and governed devices are electrically connected, the controlling device in this case consisting of any apparatus included in an electric circuit adapted to make and break said circuit at periodic intervals.

My invention is illustrated in the accompanying drawings in which—

Figure 5:
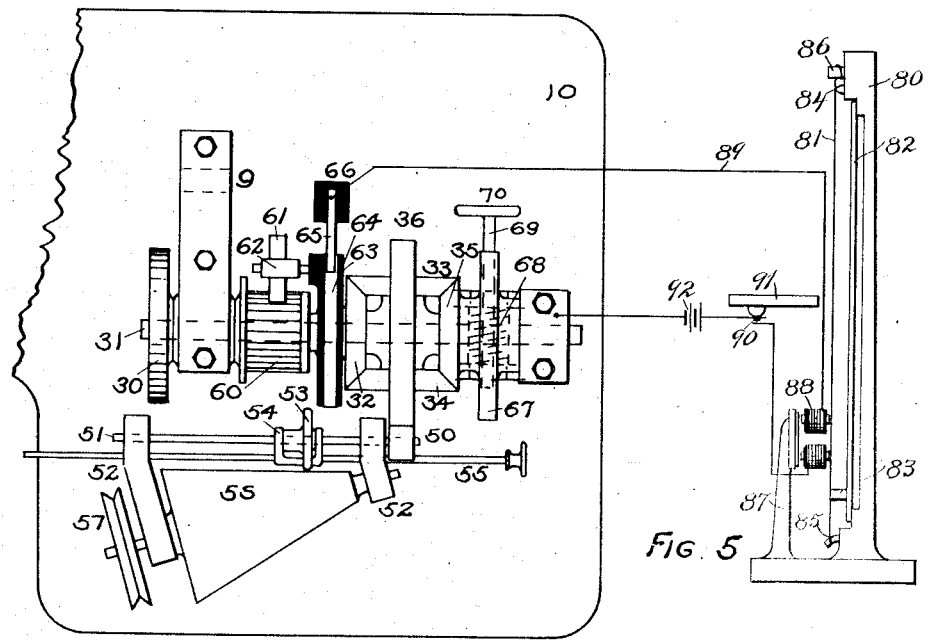

Figure 1 is a plan view partly in section of a preferred form of the mechanism employed as a governed device, showing also in side elevation a periodic circuit closing apparatus which may be employed as the controlling device. Fig. 2 is an end view of the apparatus shown in plan in Fig. 1, viewed from the left side of said figure, and showing the parts in one position; Fig. 3 is a view similar to Fig. 2, but showing the parts in another position. Fig. 4 is an end view of a similar apparatus, except that in this case there is a mechanical connection between the controlling and governed devices. Fig. 5 is a plan view of a portion of the apparatus, illustrating a modification of the adjusting devices and the application of the synchrorotor to the production of musical tones.

Referring to Figs. 1, 2 and 3 of the drawings, I have shown at the bottom of Fig. 1 a form of circuit-closer which may serve as the controlling device, consisting of a rotating shaft 2, driven by clockwork or other suitable means at a rate corresponding to the periodic interval to be synchronized at the governed device and carrying a commutator having an electrically insulating segment 3. This circuit closer may be located at any point in reference to the synchrorotor, as the connection between them is entirely electrical. An insulated metallic spring 4, is arranged to bear against the surface of the commutator in the path of said segment, and wires 5 and 6 are connected to said spring 4 and to the journal of shaft respectively and lead therefrom to the governed device, a battery 7, or other source of electric energy, being included in the circuit. The rotation of the shaft 2 will evidently result in breaking the electric circuit whenever the spring 4 is in contact with the insulating segment 3, while at other times the circuit will be completed by the contact of said spring with the metallic portion of the commutator. This circuit controller is entirely diagrammatical in character, is not a part of this invention, and may be replaced by any other form of 1 mechanism which will serve to periodically open and close an electric circuit.

The device employed at the receiving station comprises, according to the construction shown, a shaft 8 suitably journaled in supports 9, secured to a base 10. Upon the shaft is mounted a driving device consisting of a friction clutch comprising a continuously driven and loosely journaled pulley 11, provided with a double faced ring 12, which may be cast integral with the web of said pulley and makes frictional contact on both its faces with friction pads or plugs secured to the ends of two spiders 14, and 15. Spider 14 is attached rigidly to shaft 8. Spider 15 is splined to the shaft 8 by means of a key 17 and spring-pressed toward spider 14 by means such as a spring 18 bearing against a collar 19. The shaft 8 is thus frictionally driven, and its rotation is controlled by means of an electrically operated stop, which preferably consists of an electromagnet 20, the armature 21 of which is connected to a pivoted stop rocker 22, one end of which is located either within or adjacent to the path of some part revolving with the shaft 8, such as an extension 23 formed on the spider 15, according to the position of said armature. In order to diminish the shock caused by the engagement of the extension 23, with the stop rocker 22, and also to lessen the tendency of such engagement to force the armature 21 away from the magnet, I prefer to provide the engaging end of the stop rocker 22 with a pivoted finger 24, supported by a rubber buffer 25, and to so locate the pivot on which said lever turns that the impact or pressure of the extension 23, upon the finger 24, will be exerted nearly in a line passing through said pivot, the latter being located just far enough outside of said line to cause the pressure of the extension 23 to exert a lateral thrust upon said lever sufficient to throw it outward when the magnet 20 is deënergized. The same result may be accomplished or contributed to by beveling the end of the finger 24, as shown, the extension 23 being preferably provided with an antifriction roller 26, to serve as the coöperating contact surface when the stop operates.

On the shaft 8, is loosely mounted a fly wheel 27, which is connected with and driven by said shaft through the medium of a spring 28, secured at one end to said fly wheel and at the other end to some member carried by the shaft, such as the hub of the spider 14. To the fly wheel 27 is connected in any suitable manner the part or mechanism to be synchronized. This mechanism is herein diagrammatically illustrated by gear 29, which is rotatively mounted on shaft 8 and is firmly secured to fly wheel 27, gear 30 in engagement therewith, shaft 31 to which gear 30 is secured, bevel gear 32, also secured to shaft 31, bevel gears 33 and 34, rotatively mounted in gear 36, bevel gear 35 and commutator 37, rigidly secured together and rotatively mounted on shaft 31. Bevel gears 32, 33, 34, and 35 and their mounting gear 36 constitute a differential gear of which the purpose will be disclosed later.

The operation of the parts above described is as follows: The pulley 11 is driven continuously by suitable means at a speed such that it will perform one complete rotation in an interval somewhat less than that of the periodic impulses received from the controlling device and by reason of its frictional connection with the shaft 8, it will rotate said shaft, together with the fly wheel 27, and the synchronized shaft 31, at its own speed so long as no obstacle to such rotation is interposed by the stop mechanism. The latter can interpose no such obstacle as long as the circuit through the wires 5 and 6 is open and the magnet is deënergized, but whenever said circuit is completed and a current is sent through the magnet, the finger 24 will be firmly held in the path of the roller 26, and if, while the circuit is closed, said roller is brought by the rotation of the pulley 11 into contact with the finger 24, the further rotation of the shaft 8 will thereby be prevented until the stop lever is released by the breaking of the circuit. As soon as the circuit is broken, the pulley 11 will turn the shaft 8 through another revolution, during which the circuit will again be closed, and since this revolution will be accomplished in a less interval than that elapsing between the periodic breaks in the circuit, the roller 26 will again come in contact with the finger 24, while the stop lever is held by the magnet 20, whereupon the rotation of the shaft 8 will again be arrested until the circuit is again broken. The breaking of the electric circuit at the periodic intervals is accomplished at the controlling device by the rotating shaft 2 or otherwise, as above described, and hence in this manner the shaft 8 will be prevented from making more than one rotation in each of the periodic intervals, although the pulley 11 will make somewhat more than one rotation in each interval.

The rotation of the shaft 8 will, therefore, be intermittent, and in each of the periodic intervals it will perform a complete rotation which will occupy less than the entire interval, and it will also have a period of rest equal to the difference between the periodic interval and the interval required for one rotation of the pulley 11. Since the speed of the shaft when in motion is slightly greater than the average speed imparted to the fly wheel and synchronized mechanism, it is evident that the tendency of the shaft while in motion is, during a certain part of its motion, to accelerate the speed of the fly wheel, and while at rest to retard it, since while the shaft is in motion it will carry forward the end of the spring which is attached to it at a slightly greater rate than the other end of the spring will travel, so that the spring will be slightly twisted in one direction; while during the period of rest of the shaft, since the end of the spring attached to the shaft will be at rest, the end attached to the fly wheel will travel forward and impart a twist to the spring in the opposite direction from that previously given. By a suitable relation between the inertia of the fly wheel and synchronized mechanism and the strength of the spring, the variations in speed of this mechanism may be made so small as to be negligible, and the rotation will be substantially uniform and will correspond in number of turns in a given time to that of the shaft 8. The synchronized shaft 31 and fly wheel will thus be given a substantially uniform speed of rotation at a rate bearing a definite relation to the periodicity of the circuit closer at the controlling device.

The spider may be provided with any number of stops, so that its rotation will be interrupted more than once in a revolution, and its speed may be made in this way to bear any ratio less than unity to the periodicity of the breaking of the circuit.

As a safety device to prevent the fly wheel from running farther ahead of the spider 14 than is desirable should the periodic circuit breaker fail to open the circuit at the proper moment, there is installed in the circuit a circuit breaker consisting of contact strips 6' and 7' mounted on an arm 22' on rocker 22. The end of the contact strip 7' is extended to engage a projection (preferably of insulating material) 27' on fly wheel 27, when the armature 21 is in contact with magnet 20. Projection 27' has an inclined face and if the fly wheel 27 runs ahead of spider 14 sufficiently to permit it to engage the end of strip 7' it will push it away from strip 6' thus opening the circuit and effecting the release of stop 24. Normally the stop will be released before projection 27' can engage strip 7' and the strip 7' is then carried out of the path of projection 27' by the retreat of rocker 22 and attached arm 22'.

In order to compensate for variations in the work to be done in maintaining in rotation the device to be synchronized which may arise through variations in the pressure of brushes on a commutator or similar causes, I arrange a friction brake, as is shown in Fig. 2 to press with an adjustable pressure on the rim of the fly wheel. A lever 96, pivotally secured to base 10, carries a friction plug 97. Lever 96 is pressed against fly wheel 27 by a screw 92 passing through a tapped hole in standard 93 and bearing against a leaf spring 94. By turning the screw in or out the friction of the plug 97 against the face of fly wheel 27 may be varied to increase or diminish the work to be done.

In Fig. 4 a mechanical connection is arranged between the controlling device here represented by a rotating cam, and the governed device. The stop mechanism shown on the previous figures by magnet 20 and parts 22 and 24 is here replaced by a pivoted rocker 38, having an arm 39 arranged to engage stop roller 26 and an arm 40 connected by a link 41 to a lever 42, spring-pressed against a cam 43, secured to a rotating shaft 44. Once in each revolution of shaft 44, cam 43 will act to force arm 39 out of engagement with stop roller 26 and thus permit the rotation of shaft 8 as has previously been described.

In order to provide a means for varying the speed of rotation of a governed device, as, for instance, commutator 37 from that corresponding to the periodic rate of the controlling device, I have shown in Fig. 1 the commutator 37 driven from fly wheel 27 through a differential gear. Part 36 of this differential is a gear wheel which engages a pinion 50 secured to a shaft 51 mounted in journals 52. This shaft is splined and upon it is slidably mounted a disk 53. This disk is keyed to shaft 51, and therefore will rotate with it. A fork 54 attached to a rod 55 is arranged to slide disk 53 along shaft 51. A conical drum 56 is rotatably mounted in journals 52 and may be driven by a pulley 57 from any suitable source of power. Drum 56 is in driving contact with disk 53 in all positions of the latter along shaft 51 and obviously will impart to it and through it to gear 36 of the differential a speed of rotation varying in accordance to the position of disk 53. Every complete rotation of gear 36 will cause two rotations of bevel gear 35 and commutator 37 and if such rotation is accomplished while the synchrorotor is in operation, the rotations of the commutator resulting will be added to or subtracted from the rotations caused by the synchrorotor according to the relative direction of the respective motions.

The differential gear and the means for driving will also serve for changing the angular position of the commutator in reference to the fly wheel 27, where it is not desired to continuously add to or subtract from its rotations. This will be effected by turning shaft 51 by hand to the extent desired. In Fig. 5 another means of adjustment for the differing speeds of different synchrorotors is shown. The commutator 60 is secured to shaft 31, which is driven as through gear 30 from the same driving mechanism that is shown in Figs. 1, 2, and 3 and which it is therefore unnecessary to show here. The commutator 60 will rotate at the speed of gear 30 and shaft 31. A brush holder ring 63 of insulating material carries brush holder 62 and brush 61 which bears upon commutator 60. Brush holder 62 is electrically connected with a contact ring 63 on the outside of brush holder ring 64 and a brush 65, mounted on an insulating block 66 on the base 10 of the machine makes contact with this contact ring. Brush holder ring 64 is secured to bevel gear 32, forming a part of a differential gear, which consists of bevel gear 32, bevel gears 33 and 34, pivotally mounted in adjusting gear 36, and bevel gear 35. Gears 32, 35, and 36 are loosely journaled on shaft 31, while adjusting gear 36 engages the pinion 50 of a variable speed mechanism identical in character and operation with that previously described. Bevel gear 35 is secured to a worm wheel 67, which is engaged by a worm 68, secured to shaft 69 which is journaled in the base 10 and which may be readily turned by hand through an attached head 70. It will be obvious that the brush 61 may be rotated about shaft 31, either by moving adjusting gear 36, through the variable speed mechanism provided, by moving gear 35 by turning shaft 69 and its attached worm 68 or by accomplishing both motions at the same time, and thereby the revolutions of commutator 60 in respect to the brush may be diminished or increased by moving the brush in the same or opposite direction to the motion of the commutator.

Contact brush 65, contact ring 63, brush holder 62, brush 61 and any selected bars of the commutator are parts of the signaling circuit which it is the purpose of the machine to maintain. Other brushes, contact rings and contact brushes may be added where more than one signaling circuit is desired. An an illustration we may assume that all of the bars of the commutator except one are completely insulated. This one is connected to shaft 31 and the frame of the machine is made a part of the signaling circuit containing a suitable source of current. Obviously once in each revolution of the commutator the circuit will be completed through the commutator bar and brush 61 and an impulse sent into the line. If more than one impulse per revolution is desired it is only necessary to connect other bars with the first.

This adjustment of relative rotational speed between commutator and brushes will be most desirable in synchronous telegraphy where it is desired to keep in step commutators or kindred devices at distant points in order to accurately distribute among a number of local circuits at one point, the impulses sent from a similar number of local circuits at another point and transmitted over a single line or by the methods of wireless telegraphy between the two points, as is done in the systems of Delaney, Rowland and others. We will assume that synchrorotors are located at these points and that the controlling devices are clocks having pendulums beating seconds and operating circuit breakers once per second. Even with the most accurate clock mechanism exact isochronism cannot be attained and a difference between the clocks of from one to five beats per day may be expected. As the number of beats of a seconds pendulum per day is 86,400 it will obviously be necessary at one point to add to or subtract from every 86,400 rotations of the commutator resulting from the operation of the synchrorotor a number of rotations equal to the difference between the beats of the two clocks per day if the clock at the other point is beating exactly seconds. This will be accomplished and the relative rotation of the two commutators in respect to their brushes made synchronous by a suitable arrangement of the differential gear and variable speed drive.

An important use of my device is in connection with the production of musical sounds in that class of instruments, such as the choralcelo, wherein steel strings, supported, in connection with a sounding board upon a piano plate, are vibrated by the action of electromagnets, placed in juxtaposition thereto and periodically energized by an interrupted current. In Fig. 5, a piano plate 80, carries a steel string 81, and sounding board 82. String 81 bears at one end on a bridge 83, secured to sounding board 82, and upon a rail 84 at the other, and is stretched between pin 85 and tuning pin 86 in the usual manner. Mounted on a bracket 87 and opposite the string, but not in contact therewith, is a magnet 88. The circuit 89 of this magnet includes contact brush 65, contact ring 63, brush holder 62, brush 61, commutator 60, the frame of the machine, a source of electric current and a circuit breaker 90 operated by a piano key. The commutator 60 in this case consists of nearly equal segments of conducting and insulating materials, all the conducting segments being electrically joined to one another and to the frame of the machine. Now when the key 91 is pressed down and closes circuit breaker 90, a rapidly interrupted current is sent through the magnet 88, which periodically attracts and releases the string 81. If the periodicity of the interrupted current is the same as the rate of vibration of the string, it is thrown into vibrations sufficient for producing strong musical tones. As it is found that an extremely small difference between the periodicity of the current and the rate of vibration of the string is sufficient not only to destroy the desired quality of the tone produced, but also to very greatly diminish the volume, it is essential that the speed of the commutator 60 shall be uniform and definite.

My device may be modified in many structural respects, and by the substitution of mechanical or electrical equivalents for any of the parts of the mechanism without thereby necessarily altering its essential operation. Such modification will readily occur to those skilled in mechanic arts and I have not deemed it necessary to illustrate them here.

I claim as my invention the following:

1. In a synchronizing apparatus, a governed device comprising a rotating member, driving means therefor, a stop for said rotating member, means for operating said stop, a mechanism to be synchronized, and elastic driving connections between the latter and said rotating member.

2. In a synchronizing apparatus, a governed device comprising a rotating member, a driving pulley, a friction clutch connected to said rotating member and arranged to engage said pulley, a stop for said member, means for operating said stop, a mechanism to be synchronized and elastic driving connections between the latter and said rotating member.

3. In a synchronizing apparatus, the combination of a governed device, comprising a rotating member, driving means therefor, a stop for said rotating member, a mechanism to be synchronized and elastic driving connections between the latter and said rotating member, with means for periodically releasing said stop.

4. In a synchronizing apparatus, a governed device comprising a rotating member, driving means therefor, elastic driving connections between said rotating member and the mechanism to be synchronized, a stop lever, a coöperating stop member carried by said rotating member and means for operating said stop member.

5. In a synchronizing apparatus, a governed device comprising a rotating member, driving means therefor, a stop mechanism for said rotating member, a fly wheel, mechanism to be synchronized, means for driving said mechanism from said fly wheel, and elastic driving connections between the fly wheel and said rotating member.

6. In a synchronizing apparatus, a governed device comprising a rotating member, driving means therefor, a stop for said rotating member controlled by an electric circuit, a mechanism to be synchronized, and elastic driving connections between the latter and said rotating member.

7. In a synchronizing apparatus, a governed device comprising a rotating member, a driving pulley, a friction clutch connected to said rotating member and arranged to engage said pulley, elastic driving connections between said rotating member and the mechanism to be synchronized, and an electrically controlled stop mechanism for said rotating member.

8. In a synchronizing apparatus, a governed device comprising a rotating member, driving means therefor, elastic driving connections between said rotating member and the mechanism to be synchronized, and an electrically controlled stop for said rotating member comprising an electro-magnet, a stop lever connected to the armature thereof, and a coöperating stop member carried by said rotating member.

9. In a synchronizing apparatus, a governed device comprising a rotating member, driving means therefor, an electrically controlled stop mechanism for said rotating member, a fly wheel mechanism to be synchronized, means for driving said mechanism from said fly wheel and a spring connection between said rotating member and fly wheel for driving the latter.

10. In a synchronizing apparatus, a governed device comprising a rotating member, a driving pulley, spiders 14 and 15 rotatively secured to said member, a means for pressing them against the pulley, a stop secured to one of said spiders, a pivoted lever adapted to be engaged by said stop, an electro-magnet having its armature connected to said lever, and a spring connection between said rotating member and the mechanism to be synchronized.

11. In a synchronizing apparatus, a governed device comprising a rotating member, driving means therefor, a yieldingly supported stop member, a coöperating stop member carried by the rotating member, a mechanism to be synchronized, and elastic driving connections between the latter and said rotating member.

12. In a synchronizing apparatus, the combination with an electric circuit and means for producing periodic interruptions therein of a governed device comprising a rotating member, driving means therefor, a stop for said member controlled by the electric circuit, a mechanism to be synchronized, and elastic driving connections between the latter and said rotating member.

13. In a synchronizing apparatus, the combination with an electric circuit and means for producing periodic interruptions therein of a governed device comprising a rotating member, a driving pulley, a friction clutch connected to said rotating member and arranged to engage said pulley, elastic driving connections between said rotating member and the mechanism to be synchronized, and a stop for said rotating member controlled by the electric circuit.

14. In a synchronizing apparatus, the combination with an electric circuit and means for producing periodic interruptions therein of a governed device comprising a rotating member, driving means therefor, elastic driving connections between said rotating member and the mechanism to be synchronized, a stop for said rotating member comprising an electro-magnet included in said circuit, a stop lever connected to the armature of the magnet, and a coöperating stop carried by said rotating member.

15. In a synchronizing apparatus, the combination with an electric circuit and means for producing periodic interruptions therein of a governed device comprising a rotating member, driving means therefor, a stop mechanism for said rotating member controlled by the electric circuit, a fly wheel connected with the mechanism to be synchronized, and a spring connection between said rotating member and fly wheel for driving the latter.

16. In a synchrorotor the combination of a governed device comprising a rotating member, driving means therefor, a stop for said rotating member, a mechanism to be synchronized, including two rotating parts and means for varying their relative angular velocities, elastic driving connections between said rotating member and said mechanism to be synchronized, with means for periodically releasing said stop.

17. In a synchrorotor, the combination with an electric circuit and means for producing periodic interruptions therein of a governed device comprising a rotating member, driving means therefor, a stop for said member controlled by the electric circuit, a mechanism to be synchronized, including two rotating parts and means for varying the relative rotative speed of said parts, and elastic driving connections between said rotating member and said mechanism to be synchronized.

18. In a synchrorotor, the combination of a rotatively supported device consisting of two members, a spring of which one end is secured to said device and means for producing rotation of the other end of said spring through a predetermined arc at regularly recurring intervals, with a variable speed mechanism for varying the relative speeds of rotation of said members.

19. In a synchrorotor the combination of a rotatively supported device consisting of two members, a spring of which one end is secured to said device and means for producing rotation of the other end of the spring through a predetermined arc at regularly recurring intervals, with means for adding to or subtracting from the rotations of one of said members.

20. The combination of a rotatively supported member, a spring of which one end is secured to said member, means for producing rotation of the other end of the spring through a predetermined arc at regularly recurring intervals and apparatus for increasing or diminishing the resistance offered by said member to the rotational driving force.

21. In a synchronizing apparatus a governed device comprising a rotating member, driving means therefor, stop mechanism for said rotating member, mechanism to be synchronized, including a commutator, elastic driving connections between said rotating member and said mechanism to be synchronized, a brush contacting with said commutator and adjusting means for said brush.

22. In a synchronizing apparatus a governed device comprising a rotating member, driving means therefor, stop mechanism for said rotating member, mechanism to be synchronized including a commutator, elastic driving connections between said rotating member and said mechanism to be synchronized, a brush rotationally supported and variable speed mechanism for rotating said brush.

23. In a synchrorotor, the combination of a rotatively supported fly wheel, a spring, of which one end is secured to said fly wheel, and means for producing intermittent rotation of the other end of said spring through a predetermined arc at regularly recurring intervals.

24. In a synchrorotor, the combination of a rotatively supported fly wheel, a spring having one end operatively secured thereto, and means for rotating the other end of the spring through a predetermined arc at regularly recurring intervals, said periods of rotation being separated by periods of repose.

25. In a synchrorotor, the combination of a rotatively supported fly wheel, a spring having one end operatively secured thereto, mechanism for rotating the other end of the spring through a predetermined arc, the periods of motion being separated by periods of repose, and means for causing the change from repose to motion to occur in equal intervals of time.

EDWARD G. THOMAS.

Witnesses:
   CHAS. J. FOGG,
   GEO. R. BEAL.